Patented Aug. 8, 1950

2,518,267

UNITED STATES PATENT OFFICE 2,518,267

QUATERNARY COMPOUNDS AND MANUFACTURE AND USE THEREOF AS TEXTILE TREATING AGENTS

William Baird and Thomas Barr, Manchester, Edward Sydney Lane, Leeds, and Arthur Lowe, Manchester, England, assignors to Imperial Chemical Industries Limited, a corporation of Great Britain No Drawing. Application October 5, 1948, Serial No. 52,972. In Great Britain October 7, 1947

14 Claims. (Cl. 260—295)

This invention relates to improvements in or relating to the manufacture of textile treatment agents.

According to the invention we provide a process for the manufacture of compounds of the formula

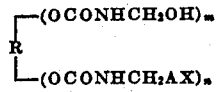

wherein R stands for an aliphatic radical, substituted or not, A stands for the group of atoms which forms an aliphatic or heterocyclic tertiary amine, X stands for the monovalent anion of a salt-forming acid, $m$ is zero or a whole number, $n$ is a whole number and the sum of $m+n$ is greater than 1, which comprises the interaction of a polycarbamate of the formula $R(OCONH_2)_{m+n}$, wherein R, $m$ and $n$ have the significance stated above, with formaldehyde or a formaldehyde yielding substance and an aliphatic or heterocyclic tertiary amine salt and/or an addition compound of an aliphatic or heterocyclic tertiary amine with an inorganic acid anhydride.

The interaction may be by stages, that is the polycarbamate may first be allowed to interact with the formaldehyde or formaldehyde yielding substance and the so-obtained methylol derivative may then be allowed to interact with the tertiary amine compound. The interaction may conveniently be carried out in the presence of a solvent or diluent, for example free tertiary amine, chloroform or hydrocarbon solvents.

Furthermore, the interaction of the tertiary amine salt with the polycarbamate and formaldehyde or formaldehyde-yielding substance, which, as said, may themselves first be interacted, may also be performed by stages; thus the polycarbamate and formaldehyde or formaldehyde-yielding substance may first be allowed to interact with a secondary amine and the so-obtained polytertiary amine which may, if desired, be isolated, may then be allowed to interact with an alkylating agent, for example dimethyl sulphate, diethyl sulphate, benzyl chloride, stearamidomethyl chloride, methylene-bis-(N:N'-dichloromethylstearamide or glycerol trichlormethyl ether.

The reaction between the polycarbamate, formaldehyde and the secondary amine may be carried out in a solvent, for example, dioxan, ethyl acetate, ethyl alcohol or methyl alcohol.

In those cases where separation of water from the reaction mixture occurs it is advantageous to remove this water before proceeding with the alkylation stage of the synthesis.

It is preferred to prepare the tertiary amine from the polycarbamate, paraformaldehyde and the secondary amine rather than by the reaction between the methylol carbamate and the secondary amine.

The resulting tertiary amines are for the most part clear viscous liquids showing little tendency to crystallise, except on standing for long periods in the cold.

As examples of secondary amines which may be used there are dimethylamine, diethylamine, piperidine, and diethanolamine.

The quaternisation of the tertiary amine with the alkylating agent may be carried out in the presence of a solvent or diluent, for example acetone. The extent of quaternisation may be followed by noting the increase in viscosity of the mixture and by the evolution of heat, which should be controlled so as to prevent thermal decomposition of the product.

The polycarbamates which are used as starting materials are derivatives of compounds of the formula $R(OH)_{m+n}$, wherein R, $m$ and $n$ have the significance stated above. They may conveniently be made by treating the compound $R(OH)_{m+n}$ with phosgene and by reacting the so-obtained chloroformic ester with ammonia or by reacting the compound $R(OH)_{m+n}$ with carbamyl chloride.

As suitable compounds and mixtures of compounds of the formula $R(OH)_{m+n}$ for making the halogenomethyl compounds there may be mentioned, for example ethylene glycol, octadecane-1:12-diol, castor oil, hydrogenated castor oil, glycerol and N:N'-ethylene-bis-ricinoleamide.

Thus as suitable polycarbamates to be used in the process of this invention there may be mentioned, for example, ethylene-1:2-bis-carbamate, hexamethylene-bis-carbamate, octadecane-1:12-diol bis-carbamate, triolein-11:11':11''-triol-tris-carbamate, tristearin-11:11':11''-triol-tris-carbamate, terephthaloyl-bis-(oxyethylene carbamate).

As suitable aliphatic or heterocyclic tertiary amines the salts and/or organic acid anhydride addition compounds of which may be used in the process of the invention there may be mentioned, for example, trimethylamine, triethylamine, N:N' - tetramethylene - diamine, dimethylcyclohexylamine, diethylcyclohexylamine, N-methylpiperidine, pyridine, α-picoline and hexamethylene tetramine.

The new compounds are white or pale coloured or clear waxy or resinous solids which are soluble in water and alcohols, and sparingly soluble in ether or acetone. Those compounds containing long chains are also soluble in benzene, toluene, chloroform and ethylene dichloride and their aqueous solutions foam on shaking but when they are boiled the foaming power diminishes. When the compounds themselves are heated above about 100° C., either in solution or in the solid state, they decompose, forming water-insoluble resinous substances. The compounds may be hydrolysed, for example when an aqueous or aqueous alcoholic solution is allowed to stand at room temperature for a prolonged period, or, more rapidly, at elevated temperatures, so that one or more of the groups —OCONHCH$_2$AX is converted into —OCONHCH$_2$OH.

By a further feature of the invention the new compounds are applied to textile materials which may be of animal or vegetable origin or composed of regenerated cellulose esters or ethers to give them improved properties including shrink-resistance and/or water-repellence and/or softness. This feature of the invention comprises impregnating the said textile materials with a solution or suspension of one or more of the new compounds in water or in a suitable organic liquid, at a convenient temperature, for example at a temperature below 60° C., and subsequently drying the impregnated material and heating to such a temperature that the said new compounds undergo decomposition, for example to a temperature of about 150° C.

An alkaline substance or a substance that has an acid-binding action, for example sodium acetate, may be added to the impregnating fluid, or may be applied to the material separately, in order to prevent or minimise tendering when the textile material comprises cellulose or cellulose esters or ethers.

Other textile finishing agents may also be added to the impregnating fluid. Thus, for example, polyvalent metal salts, for example aluminium acetate or water-repellent waxes, for example, paraffin wax, montan wax, carnauba wax and beeswax, may be added in order to improve the water-repellent properties of the textile materials. Other water-repellent agents may likewise be added, particularly water-insoluble compounds closely related chemically to the new compounds, for example methylolstearamide, methylenedistearamide, methyloloctadecylcarbamate, methylenedistearate, and methylol and alkoxymethyl derivatives of polycarbamates. Many of these compounds appear to be dispersed in the impregnating fluid by the new compounds.

The new compounds may also be applied in conjunction with compounds which are used to confer crease-resistant properties on textile materials, for example, condensation products of formaldehyde with phenols or with urea or urea derivatives, the two treatment agents being applied separately or simultaneously, i. e. from the same bath.

The invention is illustrated but not limited by the following examples in which parts and percentages are by weight.

*Example 1*

70 parts of ethylene glycol-1:2-bis-hydroxymethylcarbamate are dissolved in 250 parts of pyridine and a solution of 96 parts of pyridine hydrochloride in 250 parts of pyridine is added at 40° C. The mixture is stirred at this temperature for 18 hours. The excess pyridine is then removed by evaporation under reduced pressure at 40° C. The residual sticky mass is then dissolved in a little ethanol and acetone is added whereby the quaternary salt is precipitated as a hygroscopic solid which is readily soluble in cold water.

*Example 2*

55 parts of the polycarbamates obtained by treating hydrogenated castor oil with phosgene and then with ammonia consisting essentially of tristearin-11:11′:11″-triol tris-carbamate, are dissolved in 150 parts of chloroform and mixed with 10 parts of pyridine, 4.5 parts of paraformaldehyde and 25 parts of pyridine hydrochloride. The mixture is stirred and the temperature is raised to 65–70° C. and the water which is formed in the reaction is distilled azeotropically with the chloroform, dry chloroform being continuously added so as to keep the concentration constant. The distillation is continued till no more water separates. This usually takes 24 hours. The residual solution is evaporated to dryness under reduced pressure at 40–45° C. whereby a clear resin is formed. This resin is a mixture of quaternary ammonium salts; it dissolves readily in water to give clear solutions.

*Example 3*

55 parts of the polycarbamates obtained by treating hydrogenated castor oil with phosgene and then with ammonia, consisting essentially of tristearin - 11:11′:11″ - triol-tris-carbamate, are dissolved in 150 parts of chloroform and mixed with 10 parts of pyridine, 4.5 parts of paraformaldehyde and 13 parts of pyridine hydrochloride. The mixture is stirred at 60–70° C. for 16 hours and 10 parts of powdered chalk are then added. After stirring till all effervescence has ceased the mixture is filtered and evaporated under reduced pressure at 40° C. A clear viscous oil is thereby obtained, insoluble in water and containing no free pyridine hydrochloride, which on analysis proved to contain 0.9 mol. of combined pyridine hydrochloride.

*Example 4*

1 part of the condensation product of cetyl alcohol with 17 molecular proportions of ethylene oxide is dissolved in 20 parts of the product of Example 3 and the mixture is emulsified with 79 parts of water. 100 parts of 2 N hydrochloric acid are then added with stirring to the emulsion and a light weight wool flannel is padded in the resultant dispersion, squeezed between rubber rollers to an uptake of approximately 100%, dried at 50° C., and subsequently baked for 4 minutes at 150° C. The pattern thus prepared when milled by hand in 5% soap solution for 15 minutes shows an area shrinkage of 3% in comparison with 31.8% for the untreated material.

*Example 5*

26 parts of pyridine hydrochloride, 7 parts of paraformaldehyde and 23 parts of hexamethylene-bis-carbamate are rinsed with 230 parts of pyridine and stirred at 70° C. for 5 hours. On cooling, the mixture separates into two layers; the lower layer is washed several times with dry acetone and residual acetone is removed under reduced pressure. Hexamethylene - bis - (carbamatomethylpyridinium) dichloride is obtained as a clear deep orange coloured viscous liquid which is readily soluble in water yielding clear, pale yellow solutions which can be decomposed on heating to elevated temperatures.

Example 6

36.5 parts of dry hydrogen chloride are passed into 500 parts of dry pyridine. 80 parts of trimethylene-bis-carbamate and 30 parts of paraformaldehyde are added and the mixture is stirred at 70° C. for 5 hours. At the end of this time the mixture has separated into 2 layers; the lower layer is stirred with acetone for 10 minutes, separated and washed several times with acetone. Residual acetone is removed under reduced pressure. Trimethylene-bis-(carbamatomethylpyridinium) dichloride is obtained as a clear orange coloured, viscous liquid which is readily soluble in water yielding clear, pale yellow solutions which are decomposed on heating at elevated temperatures.

Example 7

25 parts of dry hydrogen chloride are passed into 500 parts of dry pyridine. 117 parts of terephthalyl-bis(oxyethylene carbamate) and 21 parts of paraformaldehyde are added and the mixture is stirred at 70° C. for 5 hours. 250 parts of dry acetone are added and the mixture is stirred at room temperature for 10 minutes, the quaternary salt separating out at the lower edge. This layer is washed with acetone several times. Terephthyalyl-bis(oxyethylenecarbamatomethylpyridinium) dichloride is obtained as a deep clear orange coloured viscous liquid, which is readily soluble in water yielding a slightly hazy pale yellow solution which is decomposed on heating to elevated temperatures.

Example 8

6 parts of dry hydrogen chloride are passed into 75 parts of dry pyridine. 30 parts of octadecane-1:12-diol biscarbamate and 5 parts of paraformaldehyde are added and the mixture is stirred for 5 hours at 70° C. 100 parts of acetone are added and the mixture is stirred at 50° C. for 10 minutes, after which it is filtered. The solid is then washed repeatedly with acetone. Octadecane - 1:12-diol bis - (carbamatomethylpyridinium) dichloride is obtained as a sticky yellow-brown solid, readily soluble in water to give clear solutions which are decomposed on heating to elevated temperatures.

Example 9

23 parts of dry hydrogen chloride are dissolved in 500 parts of pyridine. 37 parts of paraformaldehyde and 100 parts of trimethylene-bis-carbamate are added and the mixture is stirred at 70° C. for 5 hours. The mixture on cooling separates into two layers. The lower layer is stirred with acetone for 10 minutes and then separated. Residual acetone is then removed under reduced pressure to yield 186 parts of the N-Methylol-N'-methylpyridinium chloride derivative of trimethylene-bis-carbamate which is obtained as a clear, yellow, viscous liquid, which is readily soluble in water, giving clear, pale yellow solutions which can be decomposed on heating to elevated temperatures.

Example 10

10 parts of the product of Example 1 are dissolved in 90 parts of water. A piece of viscose rayon staple fibre fabric is impregnated in the aqueous solution, squeezed, dried and finally baked for 3 minutes at 150° C. After three laundry washes the fabric shows an area shrinkage of 7.1% compared with 19.1% for the untreated fabric. The handle of the fabric is also substantially unaffected.

Example 11

Wool flannel is padded through an aqueous solution containing 10 parts of the product of Example 6 in 90 parts of warm water, squeezed, dried and baked for 3 minutes at 150° C. When milled by hand the pattern shows a shrinkage in area of 6.7% compared with 26.7 for an untreated control.

Example 12

Viscose rayon staple fibre fabric is padded in a 10% aqueous solution of the product of Example 8, squeezed, dried and baked for 3 minutes at 150° C. The pattern when subjected to five laundry washes shows a shrinkage in area of 9.6% compared with 19.0% for the corresponding untreated fabric.

Example 13

106.7 parts of tristearin-11:11':11''-triol-tris-carbamate are dissolved in a mixture of 190 parts of ethyl acetate and 23 parts of diethylamine. The mixture is heated to boiling, 10 parts of paraformaldehyde are added and the mixture is boiled under reflux for 6 hours. The reaction mixture is then filtered and the solvent is removed from the filtrate under reduced pressure. Tristearin-11:11':11''-triol-tris-carbamatomethyldiethylamine remains as a dark golden liquid solidifying to a clear, very soft wax.

To 66 parts of the so-obtained tristearin-11:11':11'' - triol-tris - carbamatomethyldiethylamine are added 19 parts of dimethyl sulphate and, with cooling in ice water, the mixture is stirred. A vigorous exothermic reaction occurs and care is taken to see that the temperature of the reaction mixture does not rise above 40° C. As quaternisation occurs so the viscosity of the mixture increases until finally a stiff, clear, golden brown mass of tristearin-11:11':11''-triol-tris - carbamatomethyldiethylmethylammonium tri(methyl sulphate) is formed which is easily soluble in water to give clear, bright solutions which are decomposed on boiling or heating to elevated temperatures.

Example 14

106 parts of tristearin-11:11':11''-triol-tris-carbamate are dissolved in a mixture of 190 parts of ethyl acetate and 25.5 parts of piperidine and the mixture is heated to boiling point. 10 parts of paraformaldehyde are then added. The mixture is allowed to boil gently under reflux for a further 6 hours. The reaction mixture is then filtered and the solvent is removed from the filtrate under reduced pressure. Tri-stearin-11:11':11''-triol-tris-carbamatomethylpiperidine remains as a dark clear amber-coloured viscous liquid.

To 67.9 parts of the so-obtained tristearin-11:11':11''-triol-tris-carbamatomethylpiperidine are added 18.9 parts of dimethyl sulphate and, with cooling in ice water, the mixture is stirred; reaction occurs with evolution of heat. Care is taken to keep the temperature of the mass below 40° C. At the conclusion of the reaction the mixture forms a stiff amber coloured paste of tristearin-11:11':11''-triol - tris - carbamatomethyl-N-methylpiperidinium tri-(methyl sulphate) and is completely soluble to give aqueous solutions which are readily thermally decomposable. If desired the quaternisation may be

Example 15

A mixture of 70 parts of terephthaloyl-bis-oxyethylene carbamate, 300 parts of ethyl acetate, 37 parts of diethylamine and 16.5 parts of paraformaldehyde, is heated to reflux on a steam bath for 6 hours, during which time the carbonate slowly dissolves and the separation of water is observed. On allowing to cool, the lower aqueous layer is separated and the solvent layer is filtered and evaporated to dryness under reduced pressure on the steam bath. Terephthaloyl-bis-oxyethylenecarbamatomethyldiethylamine remains as an extremely viscous straw coloured liquid, substantially insoluble in water but readily soluble in dilute acids.

48 parts of this compound are dissolved in 50 parts of acetone and with vigorous stirring and cooling. 26.6 parts of dimethyl sulfate are added during one hour. Quaternisation occurs with evolution of heat (which, if uncontrolled, decomposes the quaternary salt) and forms an extremely viscous syrup in the acetone. The compound, terephthaloyl-bis-oxyethylenecarbamatomethyldiethylmethylammonium methyl sulphate is soluble in water to give clear solutions.

Example 16

A mixture of 45.4 parts of terephthaloyl-bisoxyethylene carbamatomethyl diethylamine and 25.2 parts of benzyl chloride is stirred by hand and allowed to remain at a temperature of 30° C. for 24 hours with intermittent stirring. The mixture on cooling forms a colourless extremely viscous liquid dissolving easily in water giving very slightly hazy solutions.

Example 17

Wool flannel is padded through an aqueous solution containing 5% of the product of Example 13, squeezed between rubber rollers to 100% expression and is dried at 50° C. and then baked for 15 minutes at 110° C., after which it is washed with 0.1% of oleyl sodium sulphate and 1.0% of sulphuric acid in water for 5 minutes at 45° C. and dried. The pattern thus prepared, when milled by hand, in comparison with an untreated pattern shows an area shrinkage of 1.4% compared with 30.8% for an untreated control. The handle of the material is not adversely affected.

Example 18

26.5 parts by weight of tristearin-11:11':11"-triol-tris-carbamatomethyldiethylamine is mixed with 21 parts of N:N'-dichlormethyl-N:N'-distearamido-methane which has been previously melted. Heat is developed and the mixture becomes more mobile but soon cools to a hard sticky golden brown solid which, on pasting with ethanol and dilution with water forms stable dispersions. Textile materials, impregnated with this material in aqueous dispersion, dried in warm air and baked for a short time at an elevated temperature, say 150° C. for 3 minutes, and then washed and redried are rendered water-repellent and the finish is resistant to washing with soap and water and to dry cleaning with organic solvents, e. g. trichlorethylene or white spirit.

Example 19

105 parts of tristearin-11:11':11"-triol-tris-carbamate are dissolved in 500 parts of ethyl acetate; 7.5 parts of diethylamine and 12.5 parts of paraformaldehyde are added and the mixture is refluxed for 5 hours, at the end of which time the solvent is removed under reduced pressure. The resulting compound tristearin-11:11'-dihydroxymethylcarbamate-11"-carbamatomethyldiethylamine is quaternised with 12.5 parts of dimethyl sulphate. The so-obtained tristearin-11:11'-dihydroxymethylcarbamate-11"-carbamatomethyldiethylmethylammonium methyl sulphate is a stiff golden brown sticky wad. This compound on pasting with water forms a stable aqueous emulsion, which is readily thermally decomposable.

Example 20

56 parts of octadecane-1:12-diol-bis-carbamate, 22 parts of diethylamine and 200 parts of ethyl acetate are mixed and refluxed for 4 hours with 10 parts of paraformaldehyde. The reaction mixture is filtered and the solvent is removed from the filtrate under reduced pressure leaving octadecane-1:12-diol-bis-carbamatomethyldiethylamine as a pale straw coloured viscous liquid. On long standing soft crystals, 72–82° C. are deposited.

54.2 parts of this tertiary base are intimately mixed (with external ice cooling) with 25.2 parts of dimethyl sulphate. An exothermic reaction occurs accompanied by considerable increase in viscosity of the mixture and the product, octadecane - 1:12 - diol - bis - carbamatomethyldiethylmethylammonium di-(methyl sulphate) dissolves in water yielding bright colourless solutions of high surface activity.

Example 21

132.2 parts of tristearin-11:11':11"-triol-tris-carbamatomethyldiethylamine are vigorously stirred with 200 parts of ice cold water; with continuous stirring and cooling 23.75 parts of glycerol tri(chloromethyl ether) are slowly added during 30 minutes. Stirring is continued until the reaction mixture changes from a milky emulsion to a thick viscous cream coloured paste, easily soluble in water to yield foaming solutions.

Example 22

148 parts of ethylene glycol bis-carbamate are mixed with 370 parts of a 24.8% aqueous solution of dimethylamine and to this mixture are added 180 parts of 37% aqueous solution of formaldehyde. The reaction mixture is now heated for 18 hours on the steam bath and is then filtered and evaporated under reduced pressure. When the water has been expelled ethylene glycol-bis-carbamatomethyldimethylamine remains as a golden yellow viscous syrup.

26.2 parts of this syrup are diluted with 150 parts of diethyl ether, and with stirring, 25.2 parts of dimethyl sulphate are added, causing considerable evolution of heat. A pale coloured viscous quaternary salt separates. This is washed with successive quantities of acetone and then diethyl ether, after which the quaternary salt, ethylene glycol bis-carbamatomethyltrimethylammonium di(methyl sulphate) is dried in vacuo. It forms a viscous pale yellow transparent mass dissolving with great ease in water.

Example 23

106.7 parts of tristearin-11:11':11"-triol tris-carbamate, 24 parts of aqueous 37% formaldehyde and 54 parts of aqueous 25% dimethylamine are refluxed together for three hours. At the end of this time the lower aqueous layer is run off to waste and the upper oily layer is washed twice with hot water. The oil is removed and dried under reduced pressure from a water bath at 90–100° C. Tristearin-11:11':11"-triol tris-carbamatomethyldimethylamine remains as a clear golden yellow oil which readily dissolves in dilute aqueous acids.

To 49.6 parts of so obtained tristearin-11:11':11"-triol tris-carbamatomethyldimethylamine are slowly added with constant cooling and stirring 15.2 parts of dimethyl sulphate, care being taken to see that the temperature does not rise above 40° C. as the exothermic quaternisation takes place. Tristearin-11:11':11"-triol tris-carbamatomethyltrimethylammonium tri-(methyl sulphate) is formed as a golden brown soft wax, easily soluble in water to give clear solutions which are decomposed on boiling or on heating to elevated temperatures.

Example 24

Wool flannel is impregnated with an aqueous emulsion of the product of Example 19, prepared by pasting 5 parts thereof with 5 parts of ethanol and then diluting with 90 parts of warm water. After impregnation the fabric is dried and baked for 3 minutes at 150° C. When milled by hand, the treated pattern shrinks 2.2% in area compared with 23.3% for an untreated control.

Example 25

106.1 parts of triolein-11:11':11"-triol tris-carbamate are dissolved in a mixture of 190 parts of ethyl acetate and 23 parts of diethylamine. The mixture is heated to boiling, 10 parts of paraformaldehyde are added and the mixture is boiled under reflux for 3 hours. The reaction mixture is then filtered and the solvent is removed from the filtrate under reduced pressure. Triolein-11:11':11"-triol tris-carbamatomethyldiethylamine remains as a golden viscous fluid.

To 66 parts of the so obtained triolein-11:11':11" - triol tris - carbamatomethyl - diethylamine are added 19 parts of dimethyl sulphate, and with cooling in ice water, the mixture is stirred, when a vigorous exothermic reaction occurs and care is taken to see that the temperature does not rise above 40° C. As quaternisation occurs so the viscosity of the mixture increases until finally a stiff clear golden brown mass of triolein-11:11':11" - triol tris - carbamatomethyldiethylmethylammonium tri(methyl sulphate) is formed, which is easily soluble in water yielding clear bright solutions which are decomposed on heating.

Example 26

106.1 parts of triolein-11:11':11"-triol tris-carbamate are dissolved in a mixture of 190 parts of ethyl acetate and 25.5 parts of piperidine and the mixture is heated to boiling point. 10 parts of paraformaldehyde are then added and the whole is refluxed for a further 4 hours. The reaction mixture is then filtered and the solvent is removed from the filtrate under reduced pressure. Triolein-11:11':11"-triol tris-carbamatomethyl-piperidine remains as a clear amber coloured viscous fluid.

To 67.3 parts of the so obtained triolein-11:11':11" - triol tris - carbamatomethylpiperidine are added 18.9 parts of dimethyl sulphate and the mixture is quaternised as described in Example 25. The product forms a viscous golden paste of triolein-11:11':11" - triol tris - carbamatomethyl-N-methyl-piperidinium tri(methyl sulphate), which is soluble in water yielding clear thermally unstable solutions.

Example 27

To a mixture of 106.1 parts of triolein-11:11':11"-triol tris-carbamate and 56 parts of 24% aqueous dimethylamine are added 24 parts of 37% aqueous formaldehyde and the mixture is refluxed for 6 hours. The upper layer is run off and is dried in vacuo forming a golden fluid mass of triolein-11:11':11"-triol tris-carbamatomethyl dimethylamine which is then quaternised with dimethyl sulphate as described in Example 25 to give triolein-11:11':11"-triol tris-carbamatomethyltrimethylammonium tri(methyl sulphate) which is soluble in water yielding clear thermally unstable solutions.

We claim:
1. Quaternary compounds of the formula

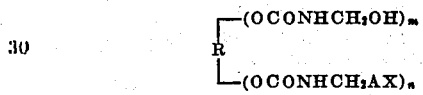

wherein R represents a radical of the group consisting of alkylene radicals, higher fatty acid esters of polyalkylols, and higher fatty acid amides of alkylene amines, X is a monovalent radical selected from the group consisting of halogen and alkyl sulphate, A represents a member from the group consisting of aliphatic and heterocyclic tertiary amines, $m$ is selected from the group consisting of zero and positive integers and $n$ is a positive integer, the sum of $m+n$ being greater than 1.

2. Quaternary compounds of the formula

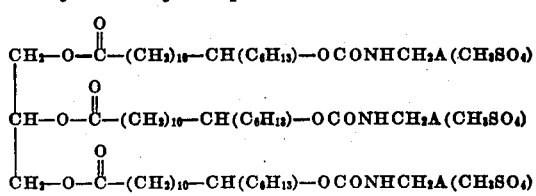

wherein A represents a member from the group consisting of aliphatic and heterocyclic tertiary amines.

3. Quaternary compounds of the type described in claim 2 wherein A represents a member from the group consisting of trimethylamine, methyldiethylamine and N-methylpiperidine.

4. Quaternary compounds of the formula

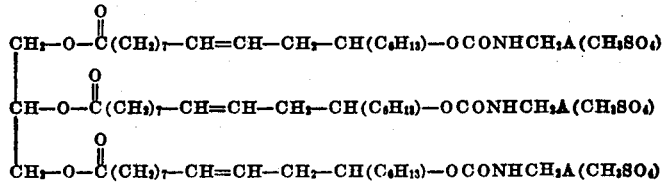

wherein A represents a member from the group consisting of aliphatic and heterocyclic tertiary amines.

5. Quaternary compounds of the type described in claim 4 wherein A represents a member from the group consisting of trimethylamine, methyldiethylamine and N-methylpiperidine.

6. A process for the production of quaternary compounds of the formula

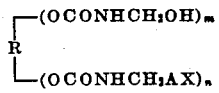

wherein R represents a radical of the group consisting of alkylene radicals, higher fatty acid esters of polyalkylols, and higher fatty acid amides of alkylene amines, X is a monovalent radical selected from the group consisting of halogen and alkyl sulphate, A represents a member from the group consisting of aliphatic and heterocyclic tertiary amines, $m$ is selected from the group consisting of zero and positive integers and $n$ is a positive integer, the sum of $m+n$ being greater than 1, which comprises reacting a polycarbamate of the formula $R(OCONH_2)_{m+n}$ wherein R, $m$ and $n$ have the significance stated above, with an aldehyde selected from the group consisting of formaldehyde and paraformaldehyde and a tertiary amine compound selected from the group consisting of aliphatic and heterocyclic tertiary amine salts and addition compounds thereof with inorganic acid anhydrides.

7. A process as claimed in claim 6 wherein the polycarbamate, aldehyde and tertiary amine compound are reacted together simultaneously to form said quaternary compounds.

8. A process as claimed in claim 6 wherein the reaction is carried out in stages, the polycarbamate being first reacted with the said aldehyde whereby a methylol derivative is formed, the latter then being reacted with said tertiary amine compound to form said quaternary compounds.

9. A process as claimed in claim 6 wherein the reaction of said tertiary amine compound with said polycarbamate and aldehyde is carried out in stages by first reacting a secondary amine with said polycarbamate and aldehyde and subsequently reacting the poly-tertiary amine thus obtained with an alkylating agent.

10. A process as claimed in claim 9 wherein said alkylating agent is dimethyl sulphate.

11. A process as claimed in claim 6 wherein said polycarbamate is derived from a member of the group consisting of ethylene glycol, castor oil and hydrogenated castor oil.

12. A process as claimed in claim 6 wherein the tertiary amine compound is derived from a tertiary amine from the group consisting of pyridine, N-methylpiperidine, methyl diethylamine and trimethylamine.

13. A process for increasing the shrink-resistance of textile materials which comprises treating said materials with a quaternary compound of the type claimed in claim 1.

14. A process for increasing the shrink-resistance of textile materials which comprises treating said materials with a crease resistant agent and a quaternary compound of the type claimed in claim 1.

WILLIAM BAIRD.
THOMAS BARR.
EDWARD SYDNEY LANE.
ARTHUR LOWE.

REFERENCES CITED

The following references are of record in the file of this patent:

UNITED STATES PATENTS

| Number | Name | Date |
| --- | --- | --- |
| 2,384,080 | De Groote | Sept. 4, 1945 |
| 2,386,141 | Rogers | Oct. 2, 1945 |
| 2,386,142 | Rogers | Oct. 2, 1945 |